United States Patent
Akkarakaran et al.

(10) Patent No.: US 12,206,607 B2
(45) Date of Patent: Jan. 21, 2025

(54) ON-DEMAND POSITIONING REFERENCE SIGNAL (PRS)

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 16/515,963

(22) Filed: Jul. 18, 2019

(65) Prior Publication Data

US 2020/0028648 A1    Jan. 23, 2020

Related U.S. Application Data

(60) Provisional application No. 62/700,703, filed on Jul. 19, 2018.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0617* (2013.01); *H04W 64/00* (2013.01);
(Continued)

(58) Field of Classification Search
CPC .... H04L 5/0048; H04W 76/27; H04W 64/00; H04W 74/0833; H04W 4/028;
(Continued)

(56) References Cited

U.S. PATENT DOCUMENTS

| 11,297,589 B2 | 4/2022 | Akkarakaran et al. |
| 2004/0185870 A1 | 9/2004 | Matsuda |

(Continued)

FOREIGN PATENT DOCUMENTS

| CN | 102422663 A | 4/2012 |
| CN | 103582115 A | 2/2014 |

(Continued)

OTHER PUBLICATIONS

International Search Report and Written Opinion—PCT/US2019/042601—ISA/EPO—Sep. 24, 2019.

(Continued)

*Primary Examiner* — Benjamin H Elliott, IV
*Assistant Examiner* — Jose L Perez
(74) *Attorney, Agent, or Firm* — QUALCOMM Incorporated

(57) ABSTRACT

Certain aspects of the present disclosure relate to methods and apparatus for on-demand UE positioning. For example a method may include transmitting a request that comprises one or more parameters based on a request configuration, to at least one of a plurality of base stations of a network, to participate in at least one of an uplink UE positioning procedure or a downlink UE positioning procedure, and receiving signaling from the at least one of the plurality of base stations of the network in response to the request.

47 Claims, 12 Drawing Sheets

1000

1002

TRANSMIT, TO ONE OR MORE BASE STATIONS, A REQUEST TO PARTICIPATE IN A UE POSITIONING PROCEDURE, WHEREIN THE REQUEST INDICATES ONE OR MORE PARAMETERS TO BE USED FOR TRANSMISSION OF POSITIONING REFERENCE SIGNALS (PRS) AS PART OF THE UE POSITIONING PROCEDURE

1004

RECEIVE, FROM THE ONE OR MORE BASE STATIONS, PRS TRANSMITTED IN ACCORDANCE WITH AT LEAST ONE OF THE PARAMETERS INDICATED IN THE REQUEST

(51) Int. Cl.
    *H04W 64/00*     (2009.01)
    *H04W 74/0833*     (2024.01)
    *H04W 76/27*     (2018.01)
    *G01S 5/02*     (2010.01)

(52) U.S. Cl.
    CPC ....... *H04W 74/0833* (2013.01); *H04W 76/27* (2018.02); *G01S 5/0205* (2013.01)

(58) Field of Classification Search
    CPC ............... H04W 40/20; H04W 52/283; H04W 74/0836; H04W 74/0838; H04B 7/0617; G01S 5/0205; G01S 1/0428; G01S 1/042; G01S 5/10
    See application file for complete search history.

(56) References Cited

U.S. PATENT DOCUMENTS

| | | | |
|---|---|---|---|
| 2011/0105144 A1 | 5/2011 | Siomina et al. | |
| 2012/0027110 A1 | 2/2012 | Han et al. | |
| 2012/0040687 A1 | 2/2012 | Siomina et al. | |
| 2012/0087299 A1 | 4/2012 | Bhattad et al. | |
| 2012/0302201 A1 | 11/2012 | Siomina et al. | |
| 2012/0307670 A1* | 12/2012 | Kazmi .................. | H04W 24/10 370/252 |
| 2012/0309376 A1 | 12/2012 | Huang et al. | |
| 2014/0073356 A1 | 3/2014 | Siomina et al. | |
| 2014/0198680 A1* | 7/2014 | Siomina .................... | H04L 5/14 370/252 |
| 2014/0228051 A1 | 8/2014 | Siomina et al. | |
| 2014/0349582 A1 | 11/2014 | Xiao et al. | |
| 2015/0018010 A1 | 1/2015 | Fischer | |
| 2015/0133157 A1* | 5/2015 | Xiao .................... | G01S 5/0263 455/456.1 |
| 2015/0181366 A1 | 6/2015 | Chae et al. | |
| 2015/0215761 A1 | 7/2015 | Chen et al. | |
| 2015/0219750 A1* | 8/2015 | Xiao .................... | G01S 5/0215 342/451 |
| 2015/0296359 A1 | 10/2015 | Edge | |
| 2015/0319731 A1 | 11/2015 | Cui et al. | |
| 2015/0365790 A1 | 12/2015 | Edge et al. | |
| 2016/0043837 A1 | 2/2016 | Han et al. | |
| 2016/0043887 A1 | 2/2016 | Han et al. | |
| 2016/0128029 A1 | 5/2016 | Yang et al. | |
| 2016/0195601 A1* | 7/2016 | Siomina ................ | G01S 5/0205 455/456.1 |
| 2016/0227365 A1 | 8/2016 | Siomina et al. | |
| 2017/0111880 A1* | 4/2017 | Park ...................... | H04W 64/00 |
| 2017/0142682 A1 | 5/2017 | Gunnarsson et al. | |
| 2017/0238131 A1 | 8/2017 | Dai et al. | |
| 2017/0238298 A1 | 8/2017 | Wang et al. | |
| 2017/0288897 A1 | 10/2017 | You et al. | |
| 2017/0331670 A1* | 11/2017 | Parkvall .............. | H04L 41/0816 |
| 2017/0339516 A1 | 11/2017 | Edge et al. | |
| 2017/0347332 A1 | 11/2017 | Cui et al. | |
| 2017/0366244 A1 | 12/2017 | Lee et al. | |
| 2017/0374638 A1* | 12/2017 | Han .......................... | H04J 11/00 |
| 2018/0124787 A1 | 5/2018 | Wang et al. | |
| 2018/0139763 A1 | 5/2018 | Bitra et al. | |
| 2018/0167775 A1 | 6/2018 | Tian et al. | |
| 2018/0205482 A1* | 7/2018 | Rydén ...................... | G01S 1/042 |
| 2018/0220392 A1 | 8/2018 | Ly | |
| 2018/0299561 A1 | 10/2018 | Jau et al. | |
| 2018/0302889 A1* | 10/2018 | Guo .................... | H04W 72/046 |
| 2019/0007923 A1* | 1/2019 | Blankenship ......... | H04L 5/0073 |
| 2019/0045529 A1 | 2/2019 | Xiong et al. | |
| 2019/0052503 A1 | 2/2019 | Hayashi et al. | |
| 2019/0074946 A1* | 3/2019 | Xue ...................... | H04L 5/0082 |
| 2019/0090092 A1* | 3/2019 | Hwang .................. | G01S 5/0215 |
| 2019/0132816 A1 | 5/2019 | Xue et al. | |
| 2019/0141555 A1* | 5/2019 | Tooher .................. | H04L 5/0057 |
| 2019/0166452 A1* | 5/2019 | Tenny ...................... | H04W 4/02 |
| 2019/0199456 A1* | 6/2019 | Chopra ................ | H04B 17/309 |
| 2019/0208366 A1* | 7/2019 | Sosnin .................. | G01S 13/876 |
| 2019/0245663 A1 | 8/2019 | Kim et al. | |
| 2019/0260425 A1* | 8/2019 | Ji .......................... | H04L 5/0091 |
| 2019/0261308 A1 | 8/2019 | Modarres Razavi et al. | |
| 2019/0297489 A1 | 9/2019 | Lei et al. | |
| 2019/0327762 A1* | 10/2019 | Takeda .............. | H04W 72/0406 |
| 2019/0334599 A1* | 10/2019 | Davydov .............. | H04L 5/0051 |
| 2019/0349938 A1* | 11/2019 | Chen ........................ | G01S 5/02 |
| 2019/0353746 A1* | 11/2019 | Razavi .................... | H04L 5/005 |
| 2020/0045667 A1 | 2/2020 | Modarres Razavi et al. | |
| 2020/0092737 A1 | 3/2020 | Siomina et al. | |
| 2020/0127785 A1* | 4/2020 | Blankenship ......... | G01S 5/0226 |
| 2020/0236644 A1* | 7/2020 | Gunnarsson .......... | H04W 64/00 |
| 2020/0274680 A1 | 8/2020 | Werner et al. | |
| 2020/0344595 A1* | 10/2020 | Chen .................. | H04W 72/0453 |
| 2021/0076225 A1* | 3/2021 | Kim ........................ | H04L 5/005 |
| 2021/0120519 A1* | 4/2021 | Si ........................... | H04L 5/0094 |
| 2021/0120522 A1* | 4/2021 | Kim ........................ | H04W 4/02 |
| 2021/0126754 A1* | 4/2021 | Da ..................... | H04L 27/26025 |
| 2021/0143957 A1* | 5/2021 | Gao ........................ | H04L 5/0044 |
| 2021/0219259 A1* | 7/2021 | Da ........................... | H04W 72/51 |
| 2021/0250892 A1* | 8/2021 | Kim ........................ | H04L 5/0048 |
| 2022/0240216 A1 | 7/2022 | Akkarakaran et al. | |

FOREIGN PATENT DOCUMENTS

| | | |
|---|---|---|
| CN | 103703841 A | 4/2014 |
| CN | 104081709 A | 10/2014 |
| CN | 105874856 A | 8/2016 |
| KR | 20150086167 A | 7/2015 |
| WO | 2012048203 A1 | 4/2012 |
| WO | 2014019125 A1 | 2/2014 |
| WO | 2015116342 A1 | 8/2015 |
| WO | 2015192113 A1 | 12/2015 |
| WO | 2015199392 A1 | 12/2015 |
| WO | 2016131165 A1 | 8/2016 |
| WO | 2017026928 A1 | 2/2017 |
| WO | 2017173033 A1 | 10/2017 |
| WO | 2017190274 A1 | 11/2017 |
| WO | 2017196510 A1 | 11/2017 |
| WO | 2018107380 A1 | 6/2018 |

OTHER PUBLICATIONS

Qualcomm Incorporated: "On Demand Transmission of PRS for NR," 3GPP Draft, 3GPP TSG-RAN WG2 Meeting #104, R2-1817902_ (On Demand PRS), 3rd Generation Partnership Project, Mobile Competence Centre, 650, Route Des Lucioles, F-06921, Sophia-Antipolis Cedex, France, vol. RAN WG2. No, Spokane. USA, Nov. 12, 2018-Nov. 16, 2018, Nov. 12, 2018, XP051557415, 27 pages.
3rd Generation Partnership Project, Technical Specification Group Radio Access Network, Evolved Universal Terrestrial Radio Access (E-UTRA), RP-090970, Stage 2 functional specification of User Equipment (UE) positioning in E-UTRAN (Release 9), 3GPP TS 36.305 V2.0.0 (Sep. 2009), 55 Pages.
Nokia., et al., "NPRS Configuration for OTDOA Positioning in NB-Iot", 3GPP TSG RAN WG1 Meeting #87, R1-1611301, Nov. 14-18, 2016, 3 Pages.
Nokia., et al., "PRS Configuration for OTDOA Positioning in FeMTC", 3GPP Draft, 3GPP TSG RAN WG1 Meeting #87, R1-1611489, 3rd Generation Partnership Project (3GPP), Mobile Competence Centre, 650, Route Des Lucioles, F-06921, Sophia-Antipolis Cedex, France, vol. RAN WG1. No. Reno. USA, Nov. 14, 2016-Nov. 18, 2016, Nov. 13, 2016 (Nov. 13, 2016), XP051175467, 3 pages, section 1-2. 2.3, Paragraph "2 . PRS configuration for Tranmission Point" Paragraph "3. PRS connfiguration for UE".
Nokia., et al., "UE Capability Indication Enhancement for OTDOA Positioning in NB-Iot", 3GPP TSG RAN WG1 Meeting #87, R1-1611304, Nov. 14-18, 2016, 2 Pages.
Sony: "NR Coexistence with eMTC", 3GPP TSG RAN NR AH3, R1-1716252, Sep. 18-21, 2017, 5 Pages.

(56) References Cited

OTHER PUBLICATIONS

Weimin L., "Research on Positioning Technology in LTE Communication System", Telecommunication Information, No. 7, Jul. 10, 2016, pp. 1-9.

* cited by examiner

ON-DEMAND POSITIONING REFERENCE SIGNAL (PRS)

CLAIM OF PRIORITY UNDER 35 U.S.C. § 119

The present Application for Patent claims benefit of U.S. Provisional Patent Application Ser. No. 62/700,703, filed Jul. 19, 2018, assigned to the assignee hereof and hereby expressly incorporated by reference herein.

FIELD

The present disclosure relates generally to communication systems, and more particularly, to methods and apparatus for on-demand positioning reference signal (PRS) in communications systems, for example, operating according to new radio (NR) technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes transmitting, to one or more base stations, a request to participate in a UE positioning procedure, wherein the request indicates one or more parameters to be used for transmission of positioning reference signals (PRS) as part of the UE positioning procedure and receiving, from the one or more base stations, PRS transmitted in accordance with at least one of the parameters indicated in the request.

Certain aspects provide a method for wireless communication by a base station. The method generally includes receiving, from a user equipment (UE), a request to participate in a UE positioning procedure, wherein the request indicates one or more parameters to be used for transmission of positioning reference signals (PRS) as part of the UE positioning procedure and transmitting, to the UE, PRS based on one or more of the parameters indicated in response to the request.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
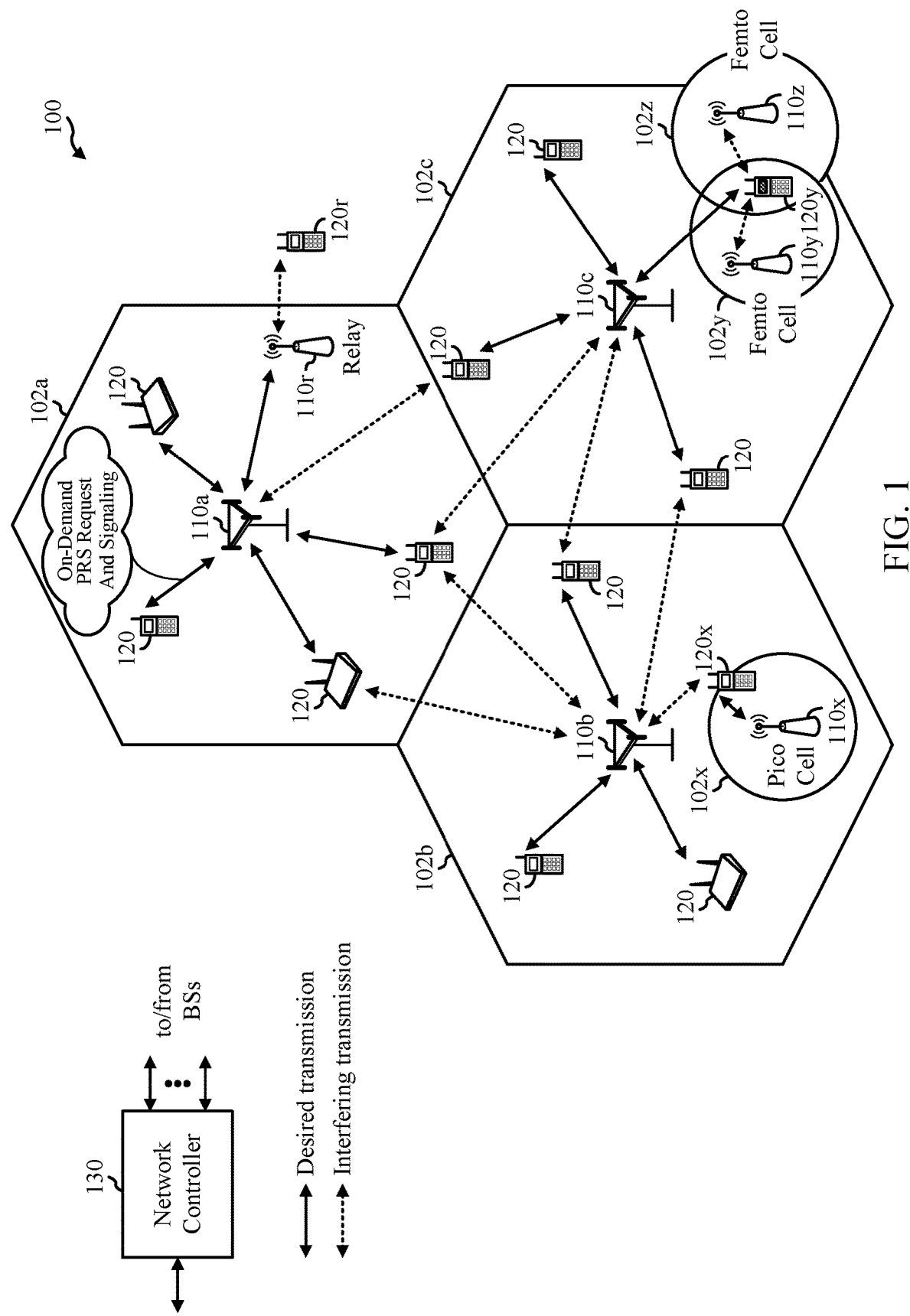
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, as illustrated, a UE 120 may be configured to send a request to a BS 110 for on-demand positioning reference signals (PRSs). Such a UE 120 and BS 110 may, for example, be configured to perform operations shown in FIGS. 10 and 11.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an internet-of-everything (IOT) device, an entertainment device (e.g., a music device, a video device, a satellite radio, etc.), a vehicular component or sensor, a vehicle (e.g. automobile, bicycle, etc), a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
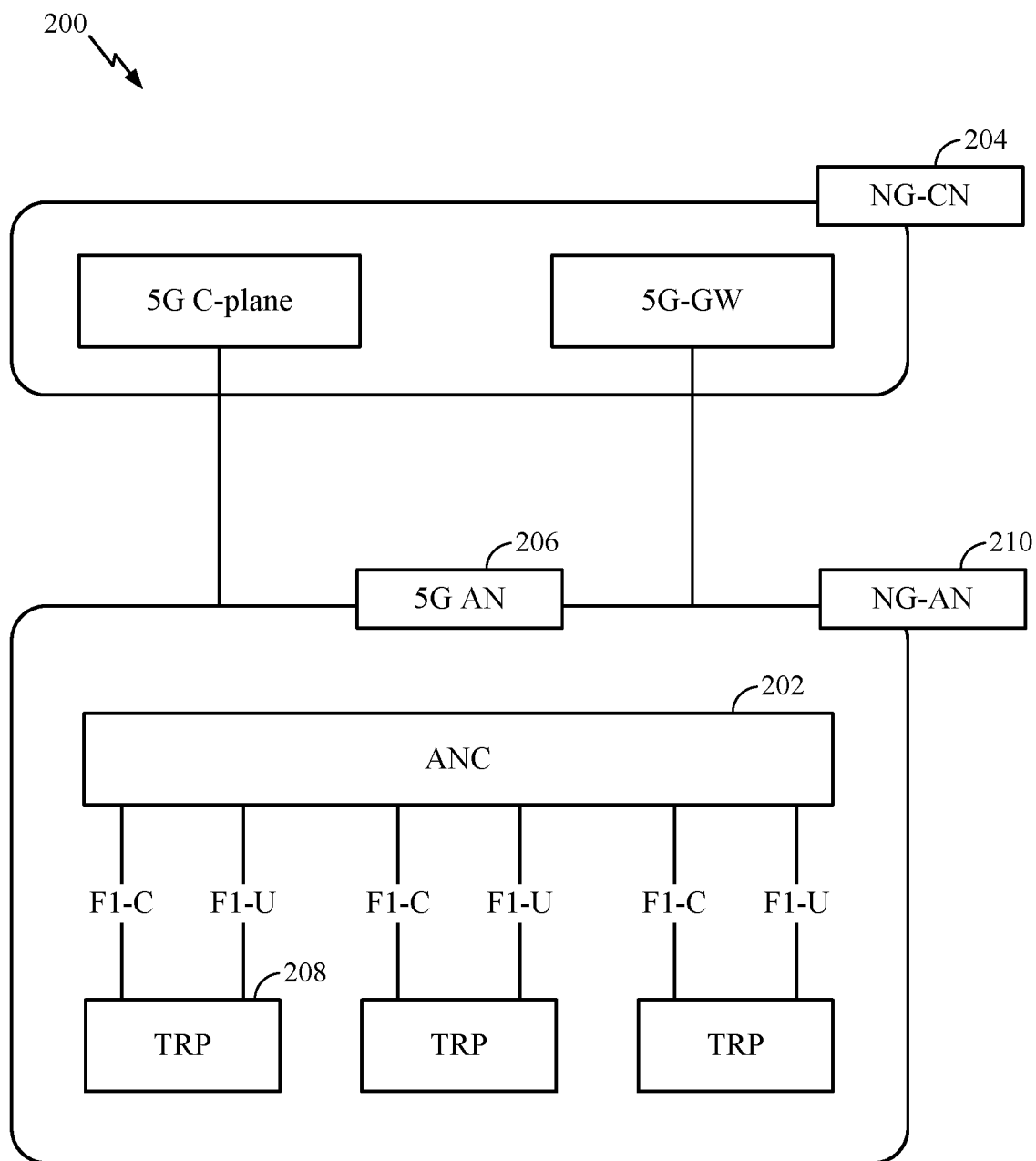
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
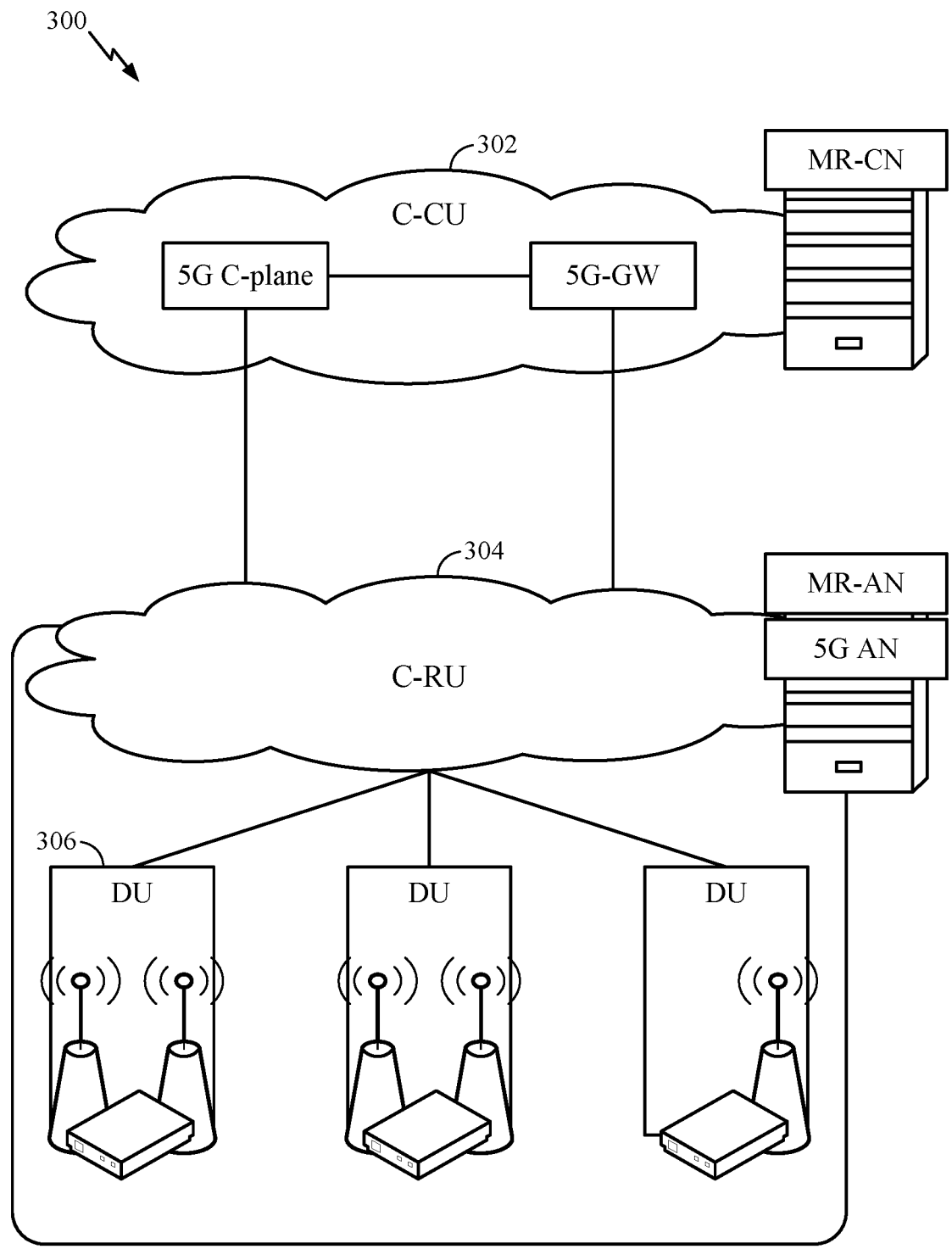
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
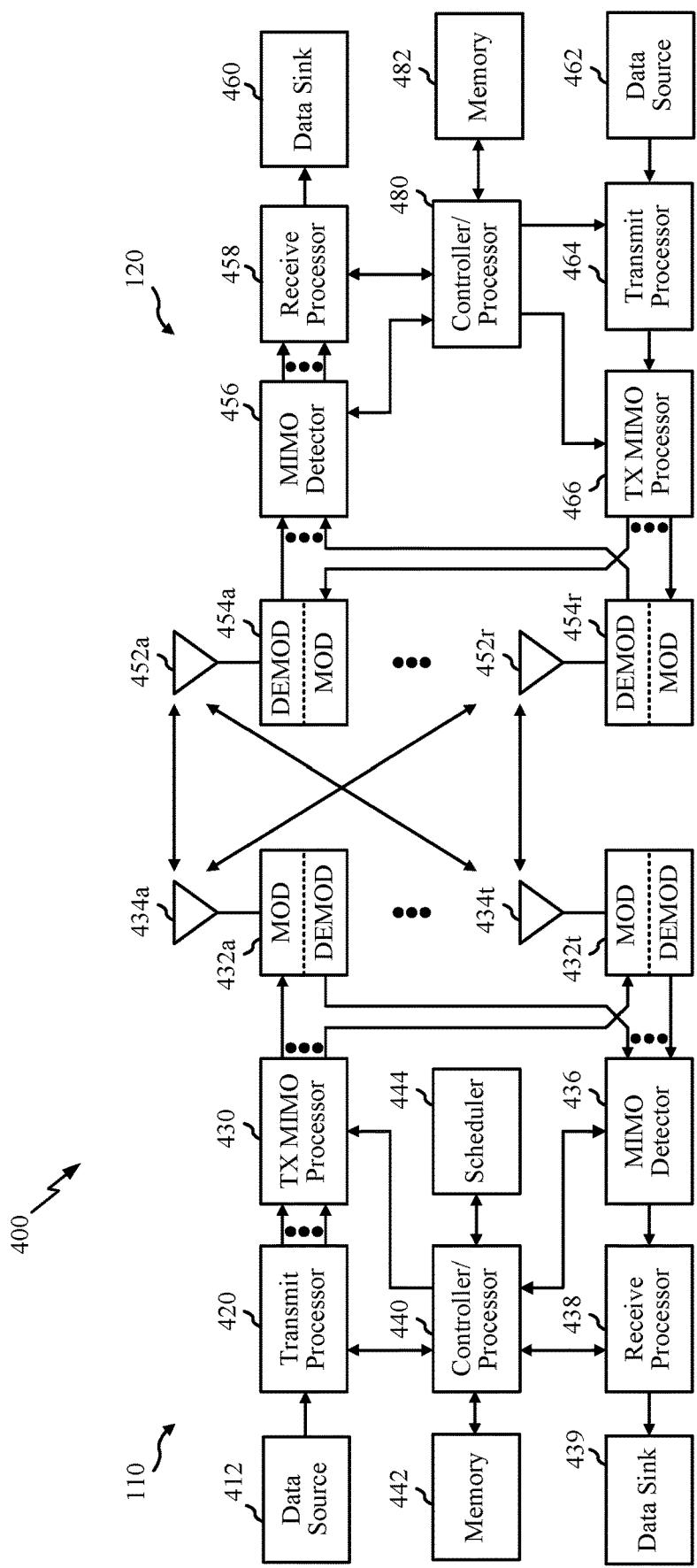
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, transceivers that includes antennas 452, processors 466, 458, 464, and/or controller/processor 480 of the UE 120 and/or transceivers that include antennas 434, processors 460, 420, 438, and/or controller/processor 440 of the BS 110 may be used to perform the operations described herein and illustrated with reference to FIGS. 10 and 11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for reference signal (RS) multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted using a transceiver, for example, via the antennas 434a through 434t, respectively.

At the UE 120, one or more transceivers that include the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 10 and 11, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
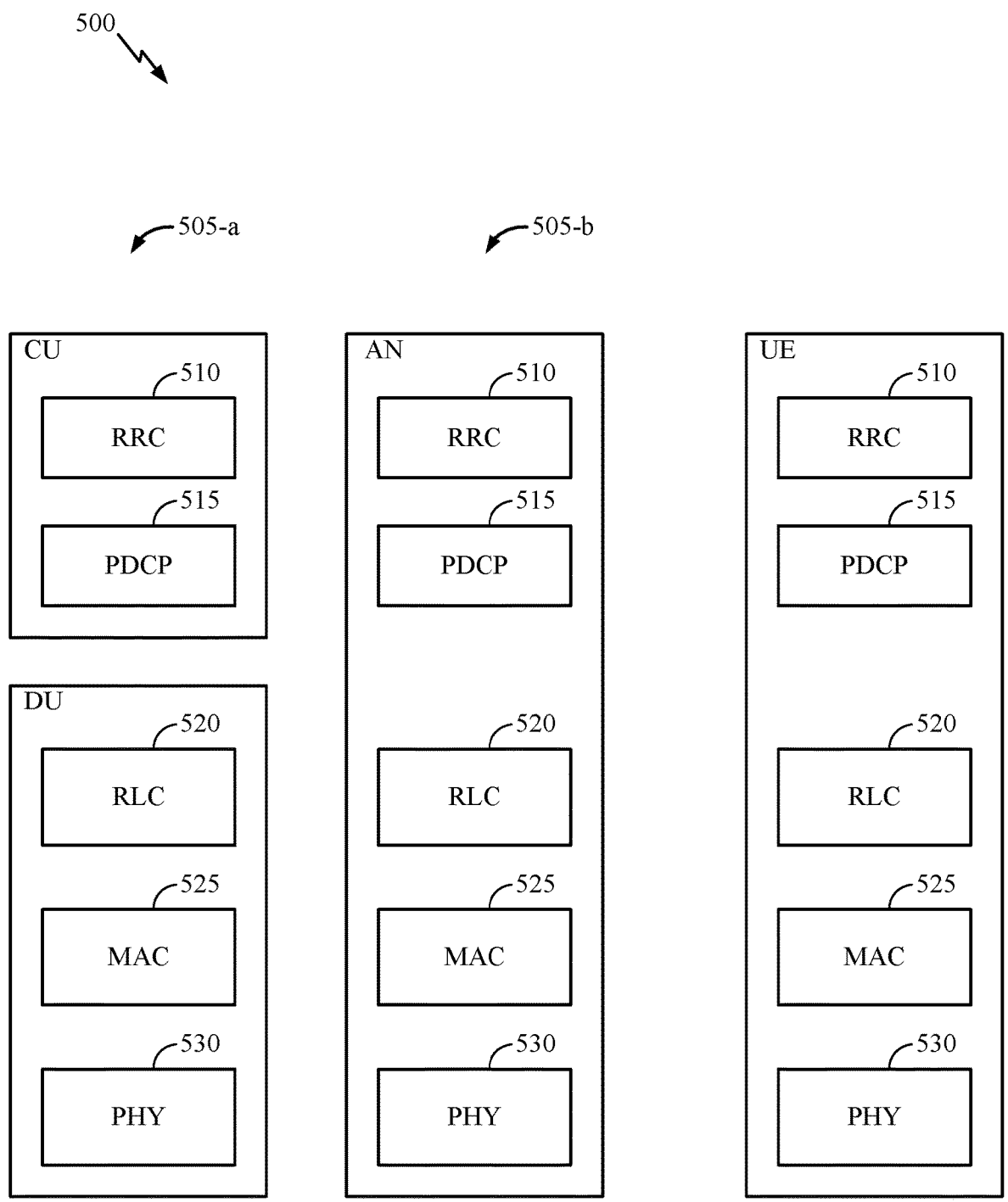
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
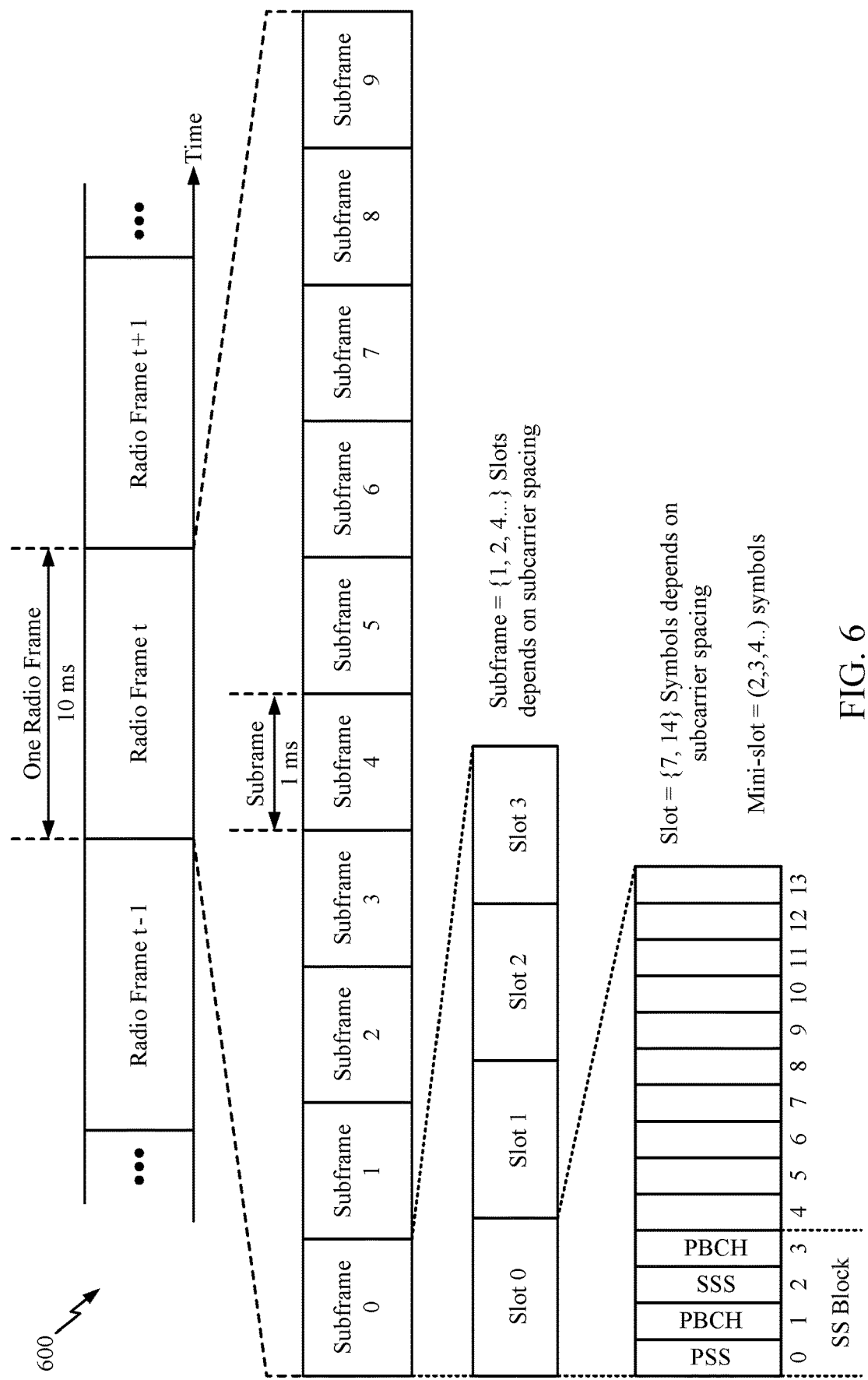
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 4, or 7 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The SS may provide the CP length and frame timing. The PSS and SSS may provide the cell identity. The PBCH carries some basic system information, such as system frame number, subcarrier spacing in SIB1, Msg.2/4 for initial access and broadcast SI-messages, cell barring information, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Examples of UE Positioning

According to aspects, and as will be described in more detail herein, multiple base stations (BSs) (e.g., Node Bs, TRPs, APs) of a wireless network may communicate with a UE. Further, in such communications, multiple Node BSs may be geographically separated from each other as well as the UE. The geographical position of the UE may often be determined in order to provide and improve communications between the base stations and the UE.

Positioning reference signals (PRSs) were introduced in LTE Release 9 to assist in determining the location of User Equipment (UE) based on radio access network information. In general, PRS signals may be transmitted within pre-defined bandwidth and according to a set of configuration parameters such as subframe offset, periodicity, and duration. The PRS bandwidth may be configurable on a per-cell basis, where 1.4, 3, 5, 10, 15, and 20 MHz bandwidths are supported. However, regardless of the bandwidth, PRS may be transmitted in the center resource blocks of a given bandwidth. Additionally, in some cases, PRS periodicity may be fixed such that all repetitions of PRS use the same bandwidth.

Further, each cell may apply a different muting pattern (defining times where the cell does not transmit PRS) in an effort to avoid interference with PRS transmitted from other cells. PRS may be transmitted at pre-defined subframes and repeated (e.g., in several consecutive subframes, with each set of subframes referred to as a "positioning occasion"). The sequence transmitted as a PRS may be based on any suitable known sequence. PRS from different cells may be multiplexed in the code domain (e.g., each cell transmitting a different (orthogonal) PRS sequence), in the frequency domain (e.g., at different frequency offsets), and/or in the time domain (e.g., using time based blanking).

As noted above, PRSs may be used in determining the location of UE, for example, based on radio access network information. The process of determining the location of a UE follows three major steps. For example, a UE may first receive PRSs from its serving cell and neighboring cells. Based on the received PRSs, the UE may measure observed time difference of arrival (OTDOA) and report a reference signal time difference (RSTD) measurement to its serving cell. The network may then use the RTSD measurement to calculate the longitude and latitude of the UE.

Figure 7:
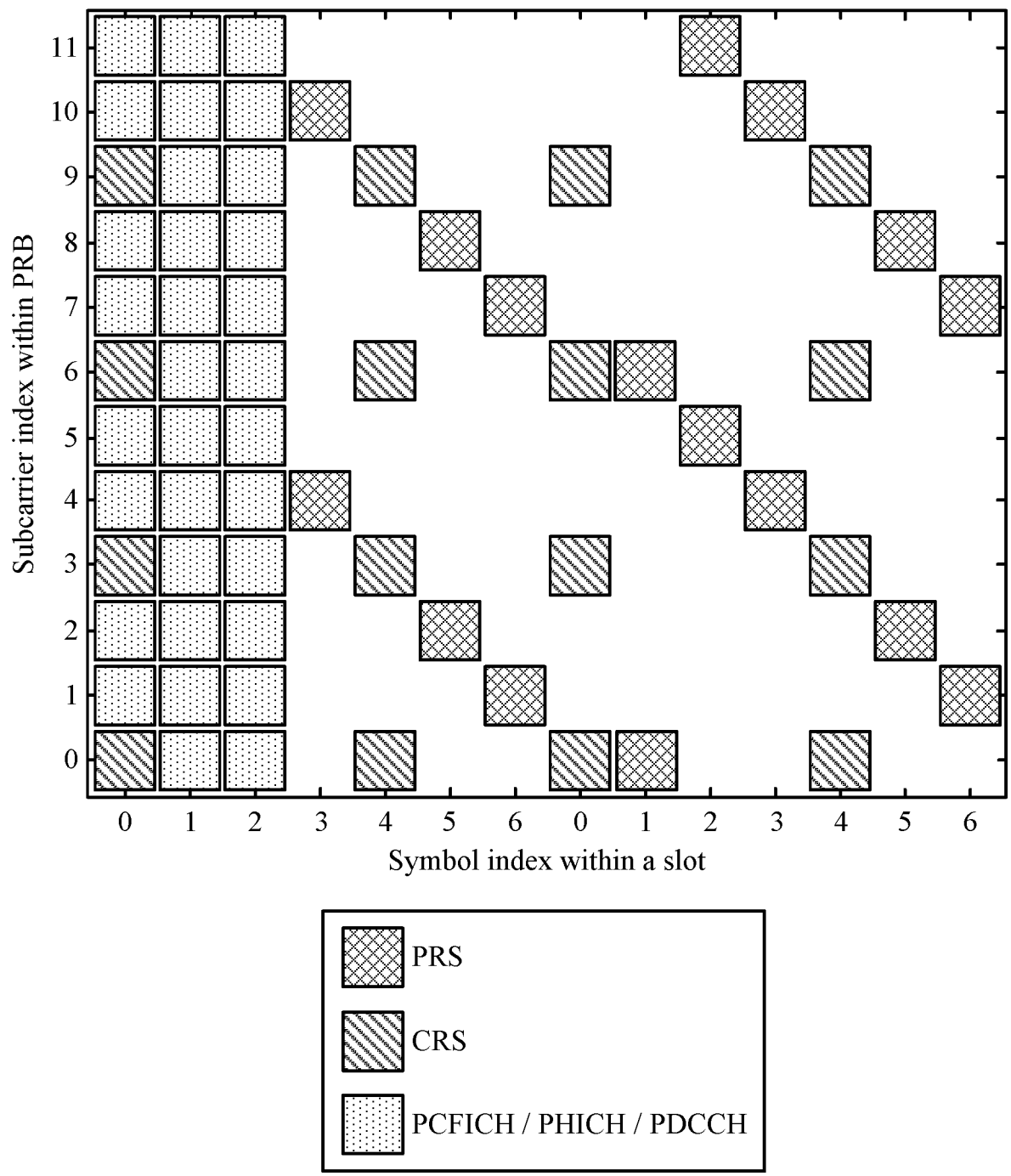
FIG. 7 illustrates an example subframe configuration scenario, in which aspects of the present disclosure may be practiced.

A specific example of a traditional LTE UE positioning reference signal (RS) scenario is shown in FIG. 7. Particularly, FIG. 7 shows an example subframe configuration for LTE UE positioning RS (PRS). FIG. 7 shows an example CRS pattern, an example PRS pattern, and example PCFICH, PHICH, and PDCCH patterns.

In this example of LTE UE Positioning RS, a PRS can be broadcast periodically with a PRS periodicity of 160, 320, 640, and/or 1280 ms. The PRS may be generated similarly to CRS in this scenario as shown. For example, a seed for a PN sequence generator may depend on a slot index, a symbol index, and a cell ID. Frequency reuse may also be provided by providing, for example, six possible diagonal frequency shift patterns, staggering PRS REs to reduce PRS collision, and by avoiding PRS collision by, for example, setting cell 0 to have the identical PRS as cell 6. In this example subframes (1, 2) and (4, 6) are considered consecutive subframes. Some features of this LTE UE positioning RS scenario can include no data transmission in RBs comprising PRS for low interference, eNBs being synchronized, as well as PRS muting to improve detectability defined as an ability to detect weak cell transmissions.

Example On-Demand UE Positioning

In one or more aspects of embodiments described herein, in NR UE positioning, reference signals and physical channels (with the possible exception of synchronization signals, PBCH/MIB, and/or PDSCH carrying MSIB) may be transmitted on-demand or event-triggered. This may have several advantages, for example, for network energy savings, or for improved efficiency of resource utilization, or for lower latency of positioning. In NR UE positioning a UE may use synchronization signals for UE positioning. Currently, periodic PRS transmission takes resources from data scheduling. Accordingly, periodic PRS transmission may be limited to provide more resources for data scheduling. Accordingly, there may be latency caused by having to wait for next instance of PRS. In contrast, with an on-demand embodiment, a request can be made for a burst of PRS 'in between' the broadcast PRS periods.

Figure 8:
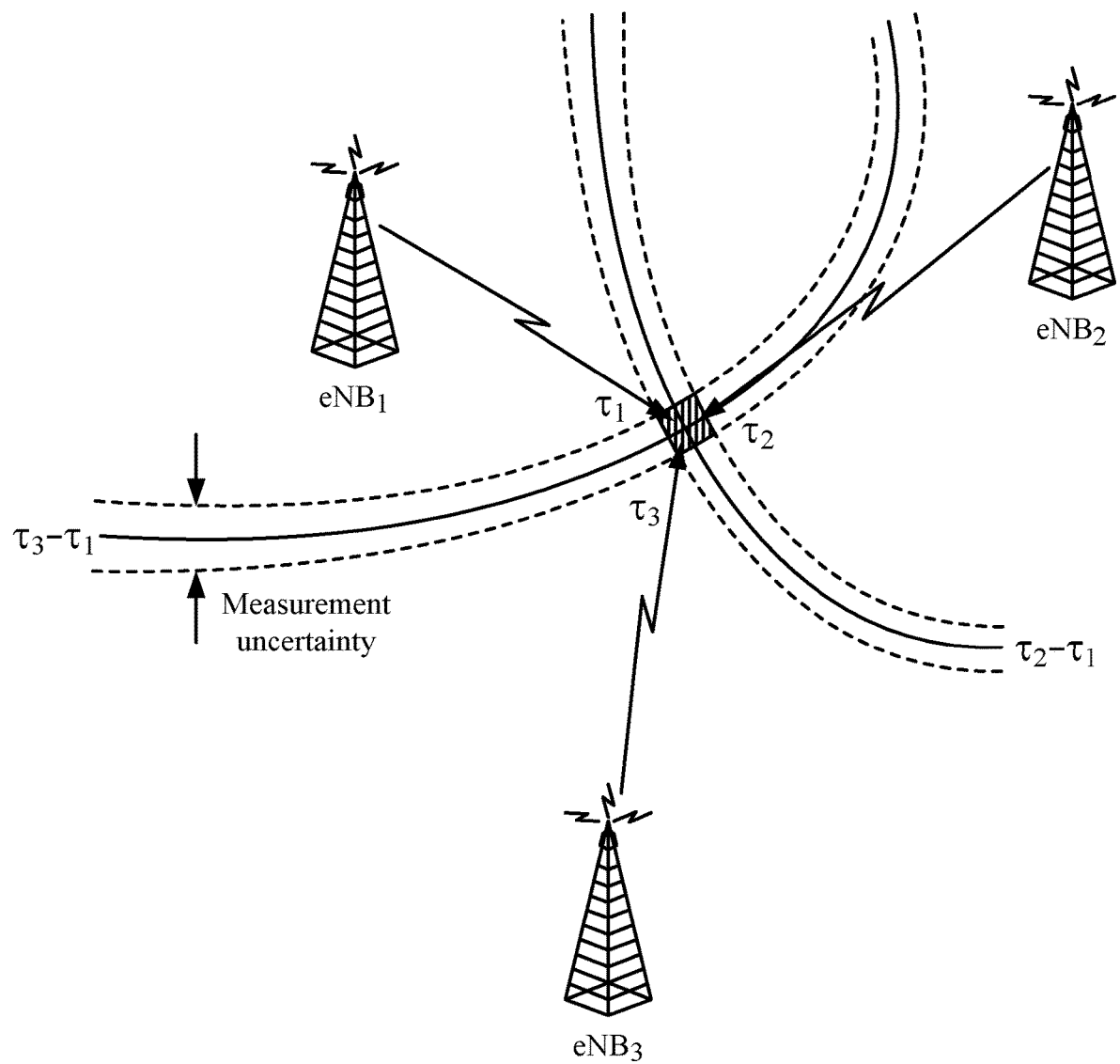
FIG. 8 illustrates an example positioning scenario, in which aspects of the present disclosure may be practiced.

As shown in FIG. 8, curves may be defined in which a measured difference in arrival time of a reference signal (transmitted at the same time) from two base stations (e.g., eNB1 and eNB2 or eNB1 and eNB3) at the same UE is the same. In other words, at any point along such a curve, the difference in time of arrival (TDOA) should be the same. By finding the intersection between three or more such curves (for three or more different pairs of eNBs), a fairly accurate estimate of UE position may be determined.

However, in some cases it may not be guaranteed that the UE may detect arrival times of at least three base stations' transmissions, as shown in FIG. 8, to estimate the UE's location. Accordingly, a reference signal and procedures may be introduced to support UE positioning while also providing network energy savings.

For example, to conserve network resources, base stations may be configured to or determine to not automatically transmit positioning reference signals (PRS). Further, to conserve power, it may be desirable that a UE not monitor for PRS all the time. The on-demand PRS procedure presented herein may help conserve network resources and help a UE conserver power.

In accordance with one or more aspects, one or more on-demand positioning procedures for NR may be defined.

In some cases, a UE may provide capability information indicating whether or not the UE supports on-demand PRS instead of, or in addition to, broadcast PRS. Such capability information may also indicate whether DL-based UE positioning, UL-based UE positioning, or both DL-based and UL-based positioning is supported.

Figure 9:
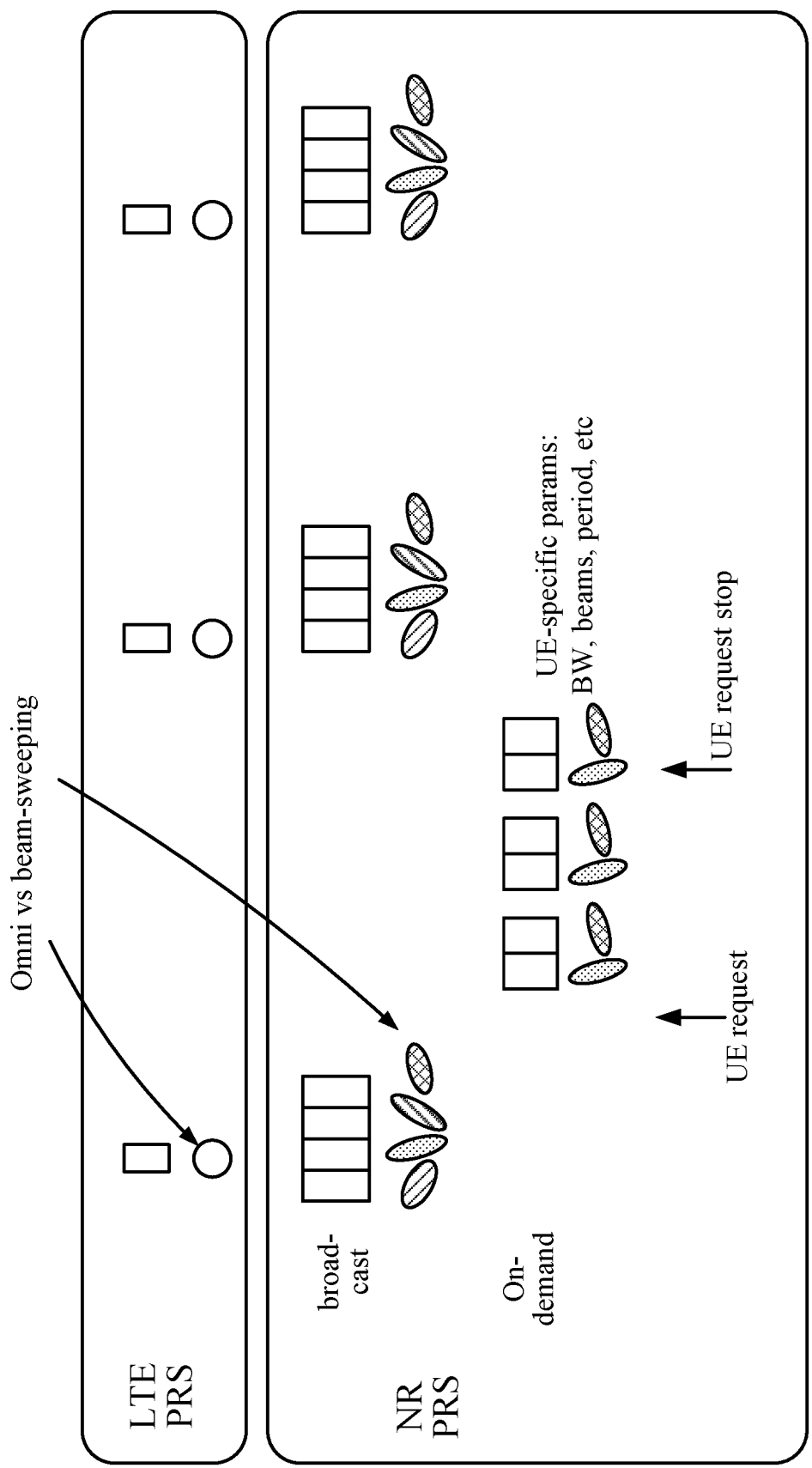
FIG. 9 illustrates example broadcast PRS, in accordance with aspects of the present disclosure.

FIG. 9 illustrates examples of different types PRS sent in LTE and NR. As shown, LTE PRS can be broadcast using an Omni-directional signal (e.g., in one slot or symbol). In contrast, the NR PRS can be sent using beam-sweeping (e.g., with a different beam used in each slot or symbol). Accordingly, it can be appreciated that in some cases NR PRS overhead resource usage may include a number of symbols and beams, particularly in a millimeter wave range (FR2) where highly direction signals are sent and beam-sweeping may be needed to reach certain users.

As described above, there may be a desire to reduce overhead of broadcast PRS and also reduce latency of positioning acquisition. Such a reduction in latency may be provided with an on-demand NR PRS. For example, a UE initiating on-demand PRS may send a request with an indication of certain (UE-specific) parameters. In some cases, the parameters may help reduce the number of beams used in beam-sweeping and/or may allow for the periodicity to be requested by the UE (e.g., to speed a sweep across beams specified by the UE). Further, in some cases, the UE may also request a de-activation (stop) of the NR PRS further helping reduce overhead usage.

Figure 10:
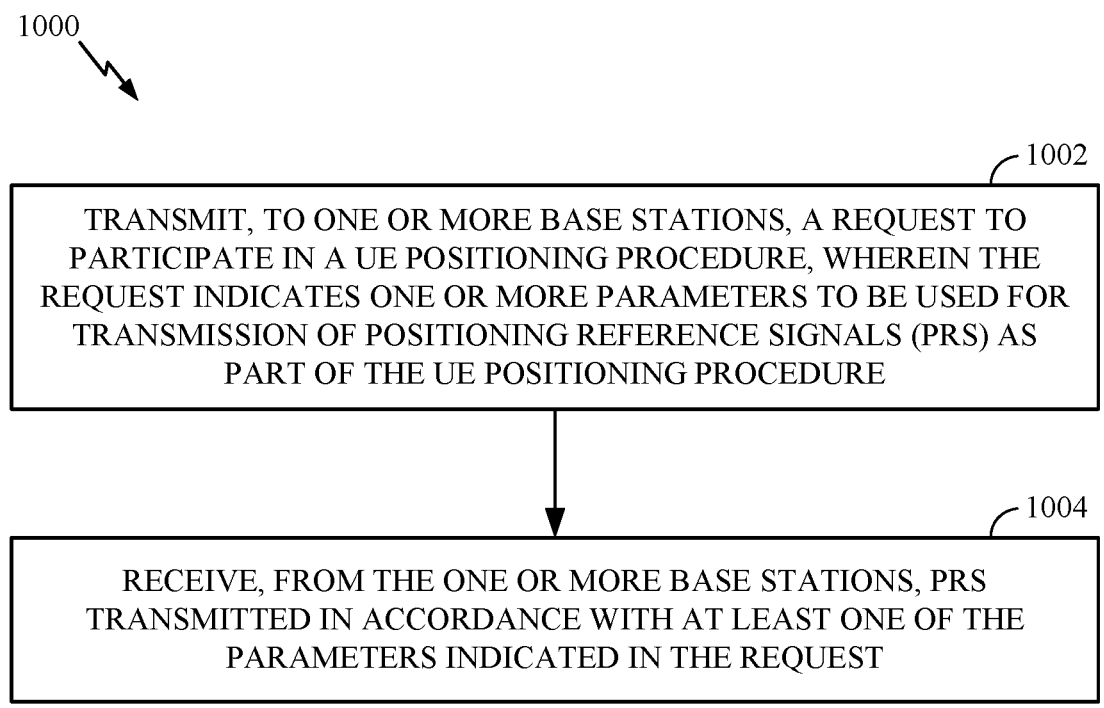
FIG. 10 illustrates example operations for wireless communications by a UE, in accordance with aspects of the present disclosure.

FIG. 10 illustrates example operations 1000 for wireless communications by a UE, in accordance with aspects of the present disclosure. For example, operations 1000 may be performed by a UE 120 of FIG. 1 to request on-demand PRS.

Operations 1000 begin, at block 1002, with the UE transmitting, to one or more base stations, a request to participate in a UE positioning procedure, wherein the request indicates one or more parameters to be used for transmission of positioning reference signals (PRS) as part of the UE positioning procedure. At 1004, the UE receives, from the one or more base stations, PRS transmitted in accordance with at least one of the parameters indicated in the request. While the signaling may be sent in response to the request, the UE may have no way to know if the signaling is actually sent in response to the request or not. Further, the UE may not know if the base station actually selected PRS parameters based on the request or based on some other considerations.

Figure 11:
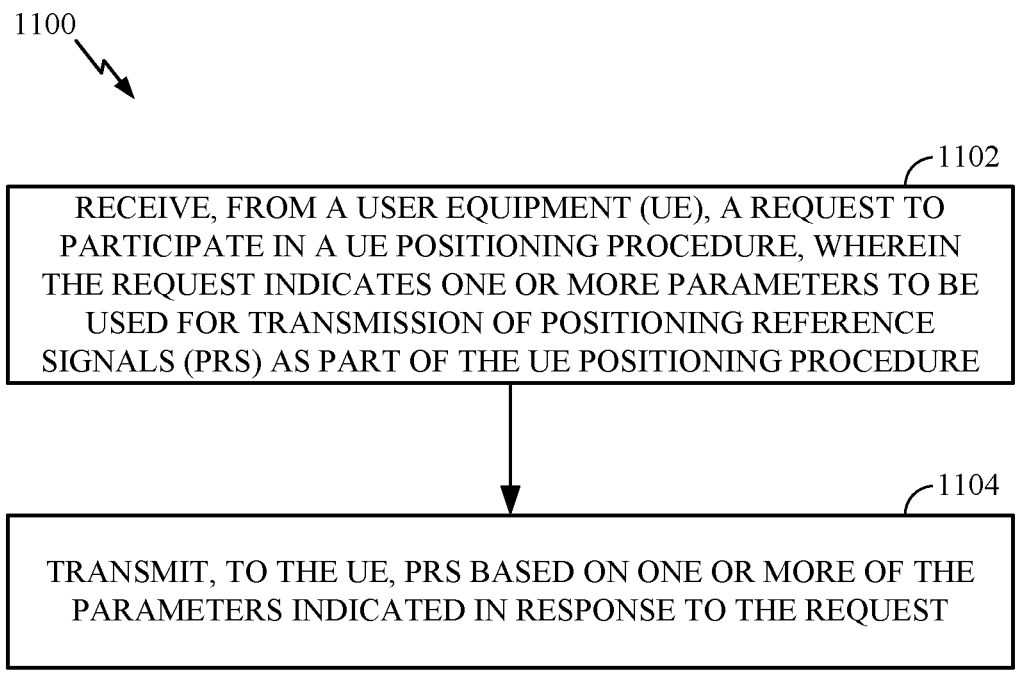
FIG. 11 illustrates example operations for wireless communications by a base station, in accordance with aspects of the present disclosure.

FIG. 11 illustrates example operations 1100 for wireless communications by a base station (or other network entity), in accordance with aspects of the present disclosure. For example, operations 1100 may be performed by a base station 110 to receive and process an on-demand PRS request from a UE 120 performing operations 1000 of FIG. 10.

Operations 1100 begin, at block 1102, with the base station receiving, from a user equipment (UE), a request to participate in a UE positioning procedure, wherein the request indicates one or more parameters to be used for transmission of positioning reference signals (PRS) as part of the UE positioning procedure. At 1104, the base station transmits, to the UE, PRS based on one or more of the parameters indicated in response to the request.

In LTE, a UE may transmit a request for location assistance from the network. However, such a request is addressed directly to some network entity (e.g., location server), and not a base station. Further, such a request may not include PRS parameters, although it may include location accuracy information. In some cases, by addressing a request directly to a base station, for example a gNB, the UE may be able reduce some latency associated with communicating with the network entity (e.g., in the core network). Such a gNB may be configured to respond directly by triggering PRS from multiple geographically separate locations, for example, the locations where remote radio heads (RRHs) for that gNB are located (assuming an RRH deployment). Even without an RRH deployment, a gNB may communicate with its neighbors over an X2 or Xn interface and trigger PRS without the need to communicate with any higher layer or deeper network entity.

In some cases, a UE may request on-demand PRS while in a connected mode between a UE and a base station. In such cases, the PRS request by UE may include a number of different parameters. For example, the parameters may include or indicate one or more of a bandwidth (BW) for sending positioning reference signal (PRS) signaling, a periodicity for sending the PRS signaling, a number of symbols per slot for PRS signaling, a number of repeated slots for PRS signaling, or a number of PRS occasions. As noted above, a UE may specify such parameters in an effort to obtain updated positioning faster than regular (relatively infrequent) PRS transmissions may allow. In some cases, a UE may specify one or more parameters in an effort to plan PRS transmissions for a future time.

In some cases, the parameters may include or indicate a comb density of a desired positioning reference signal (PRS) to use for the UE positioning procedure, and/or a quasi-colocation (QCL)/beam-direction to use for the UE positioning procedure. In some cases, the parameters may include a desired positioning accuracy or a desired application for using results of the UE positioning procedure (for example V2V, e911, etc.).

In some cases, the request from the UE to the base station may be provided via radio resource control (RRC) signaling, a medium access control element (MAC-CE), a scheduling request (SR), or a beam failure recovery request (BFRQ)-type signal. In some cases, the signaling may provide an index into a table with entries corresponding to sets of parameters (e.g., an RRC-configured parameter-combination table). In the case of a MAC-CE, the UE may receive a PUSCH assignment of resources to send the MAC-CE. In some cases, an SR-id may be associated with a parameter-set, which may reduce latency as compared to a MAC-CE based on SR periodicity.

In some cases, a base station in the network may provide a response to a UE PRS on-demand request. This response may be provided in a number of different ways and may provide a number of different functions and/or information to the UE.

For example, receipt of a request by a gNB may implicitly trigger DL PRS for certain application types, for example, for those with more urgency (e.g., V2V or e911). Alternatively, a gNB can provide signaling for configuring or triggering DL PRS via explicit signaling to the UE (e.g., via RRC/MAC-CE/DCI signaling). The signaling may also be included with other DL signaling, such as DCI assigning DL or UL grants.

A BS receiving an on-demand PRS request from a UE may or may not use all of the indicated parameters. Rather, the BS may decide which parameters to use based on various factors. Such factors may include overall network congestion, already scheduled PRS transmissions to the UE sending the request (or other UEs). In some cases, the BS may modify current parameters for PRS transmissions, based on the parameters (or other information) indicated in the request. For example, during an E911 call, a BS may increase the frequency of PRS transmissions in an effort to improve location estimation of the UE.

Because the BS may effectively pick and choose which of the parameters indicated in a request to use, the response to the request may provide some indication of which parameters are used. For example, a response may refer to parameters in the request, allowing the network response to be provided as a compact signaling (e.g., just a 1 bit Ack to indicate PRS will be performed in accordance with parameters the UE provided in the request). In some cases, a UE determines the PRS configuration parameters based on the signaling from the base station and parameters indicated in the UE request. For example, the received signaling may indicate one or more differences between the configuration settings requested by the UE and the actual configuration settings configured by one or more base stations.

In some cases, mechanisms for deactivation of on-demand PRS may also be provided. This deactivation may be provided via a UE request, or in response to UE report based on PRS. In other cases, the deactivation may be provided automatically based on PRS configuration (e.g., on-demand PRS may stop after N PRS occasions), or by gNB signaling which may be provided in RRC, MAC-CE, DCI, and/or possibly together with other DL signaling such as DCI carrying grants.

In some cases, on-demand PRS may be requested via a random access channel (RACH) procedure, while a UE is in an idle mode. For example, a PRS request by UE may be provided via a physical random access channel (PRACH). In such a case, different combinations of PRS parameters may be associated with different PRACH sequences (e.g., as indicated in SIBs). In such cases, the UE signals the combination of PRS parameters it is requesting by selecting a corresponding PRACH sequence.

A number of different network responses to UE on-demand PRS request can be provided. For example, one option may include a SIB update carrying information about a PRS configuration. The PRS may be time-limited and therefore there may be no need to monitor for further SIB update indicating deactivation. In some cases, the network response may be heard by all UEs, not just the requesting one. In such a case, broadcast reception of the network response may help save the need to transmit further signaling such as, for example a random access response (RAR) or other responses. This broadcast reception option may be preferable for lower priority requests. For example, a gNB may decide to grant the request and begin PRS transmission depending on the number of such PRS requests it receives. In accordance with another option, the network response may include RAR indicating PRS configuration, or the network response may be one of RAR, Msg3, Msg4, and/or Ack to decide PRS configuration.

Figure 12:
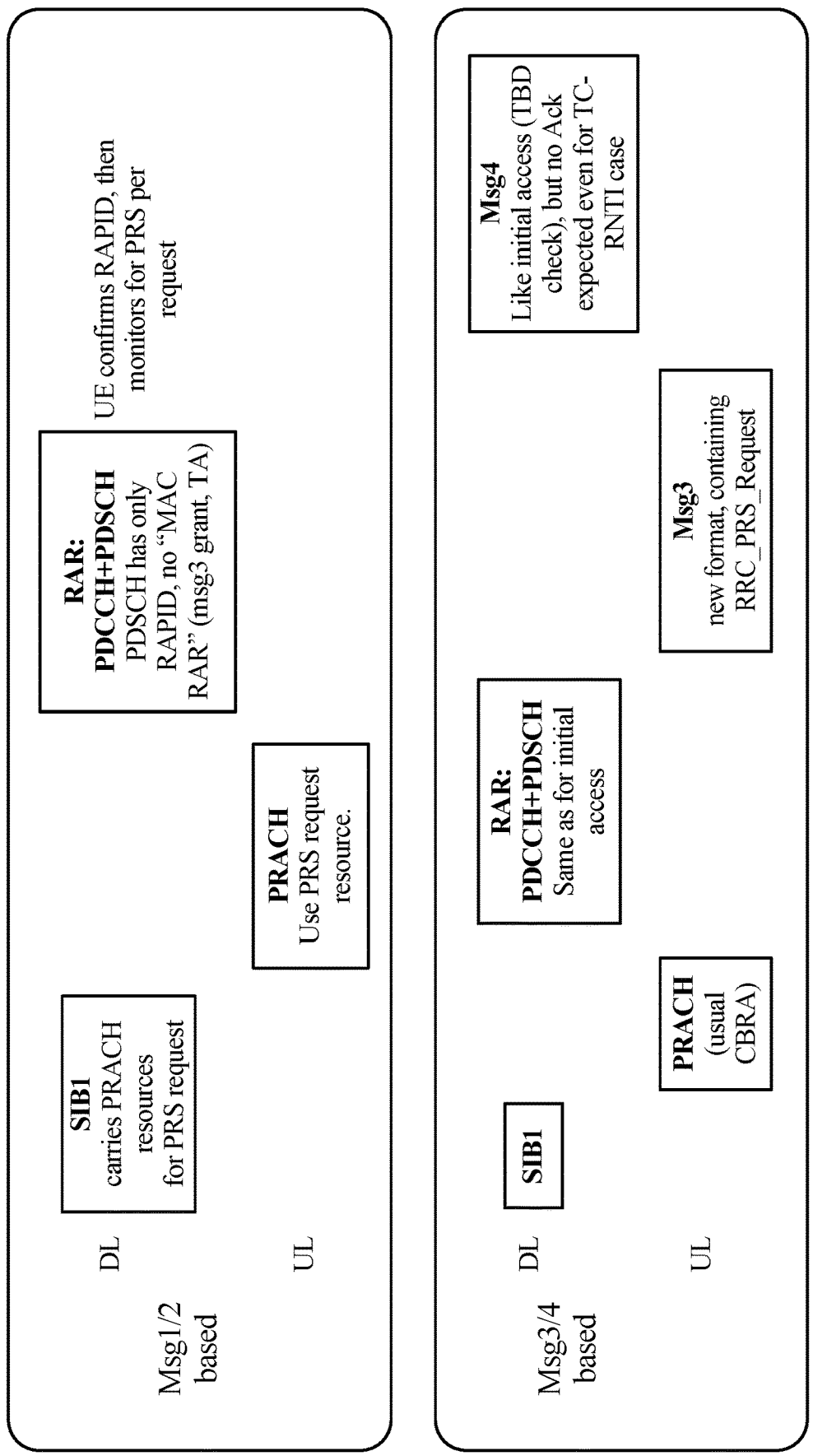
FIG. 12 illustrates example on-demand PRS request scheme, in accordance with aspects of the present disclosure.

FIG. 12 illustrates example on-demand PRS request scheme, in accordance with aspects of the present disclosure. The scheme shown in FIG. 12 may implemented by making appropriate modifications to a scheme for SI request. The scheme shown in FIG. 12 may be used in conventional 4-step RACH as shown or in a 2-step RACH (e.g., when Msg1 and Msg3 are combined in a single MsgA, while Msg2 and Msg4 are combined to form a single MsgB.

As illustrated in FIG. 12, one or both of an Msg1 and Msg2 based on-demand PRS scheme or an Msg 3 and Msg 3 based on demand PRS scheme may be provided.

As illustrated, such a case may involve a SIB1 (or a later SIB) that associates PRACH resources (e.g., sequences) with a complete PRS configuration. In another case, an Msg3/4 based on-demand PRS may be provided. In such a case, the scheme can define a new 'RRCPRSRequest', which the UE may provide via an Msg 3 and may include PRS configuration explicitly or via index into a table that is specified in the wireless communication standard and/or configured by one or more SIBs.

Some possible variations are possible when re-using mechanisms like that shown in FIG. 12 for on-demand PRS. For example, one change may include adding PRS configuration in Msg2 or Msg 4. For Msg2 or Msg 4, the addition could be in PDCCH or in PDSCH. For example, Msg2 may indicate more detailed PRS configuration information. The UE may use Msg3 to indicate further selection/indication of PRS configuration preferences (in particular, among the options indicated in Msg2), and Msg4 could confirm the configuration. Another variation may be to add an acknowledgment (Ack) for Msg4, depending on configuration choices selected. Some PRS configurations may only activate upon Ack, to avoid unnecessary activation of PRS that the requesting UE will not receive because it missed the Msg4. Such a scheme may be used when the Ack signal is expected to be reliable enough, to avoid a scenario where the UE expects but does not receive PRS, because the gNB missed the Ack. Another possible variation is to utilize a same or similar procedure for UL SRS and/or PRS as well. Such a case may include a timing adjustment (TA) in RAR, to ensure that the UL transmission (of SRS/PRS) is time-aligned at its intended gNB receiver.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 10A:
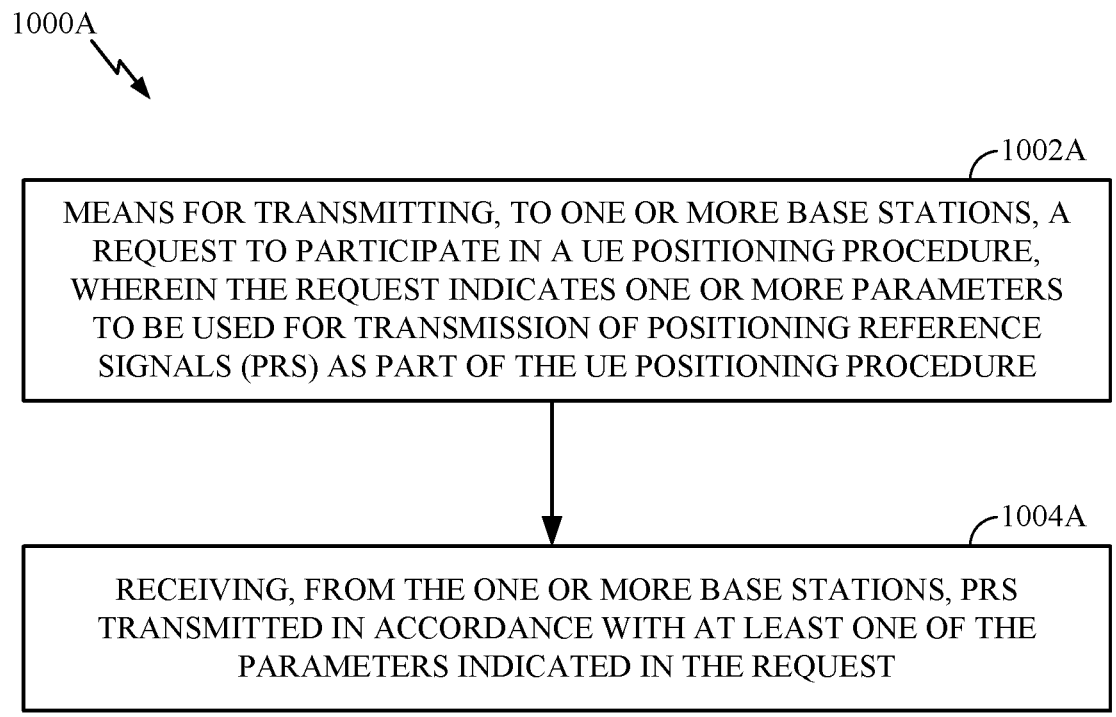
FIG. 10A illustrates example components capable of performing the operations shown in FIG. 10, in accordance with certain aspects of the present disclosure.
Figure 11A:
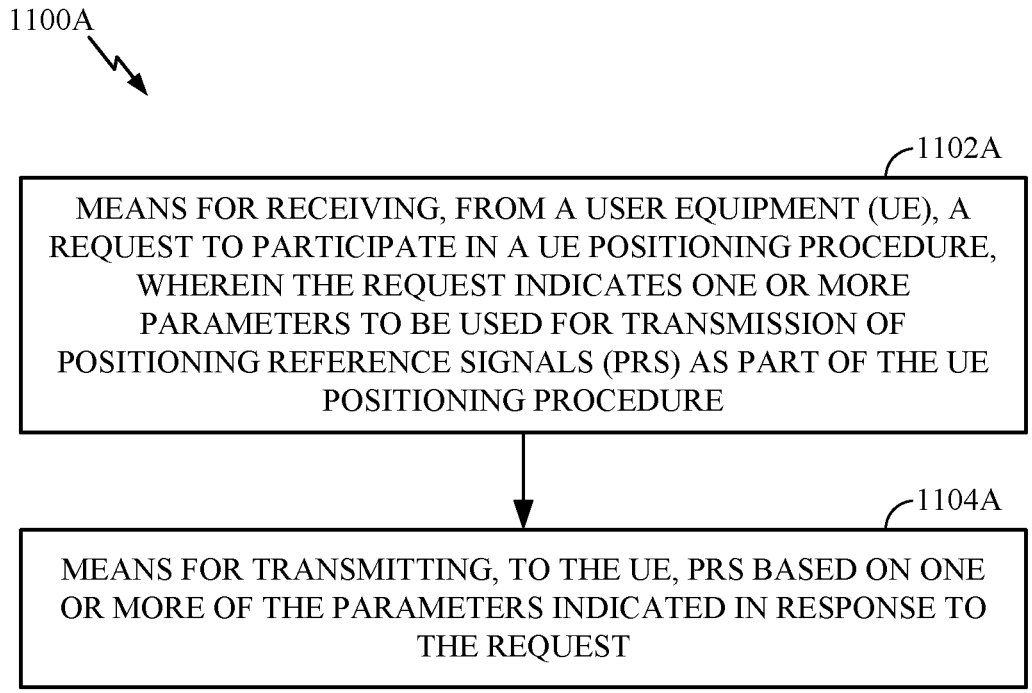
FIG. 11A illustrates example components capable of performing the operations shown in FIG. 11, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1000 illustrated in FIG. 10 and operations 1100 illustrated in FIG. 11 correspond to means 1000A illustrated in FIG. 10A and means 1100A illustrated in FIG. 11A, respectively.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for deactivating, means for configuring, means for broadcasting may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE) comprising:
    transmitting a positioning reference signal (PRS) request, wherein the PRS request indicates parameters comprising a requested comb density of a PRS and a quasi-colocation (QCL) to use; and
    performing one or more measurements based on the PRS transmitted in accordance with configuration parameters selected by a network entity based on the parameters indicated in the PRS request.

2. The method of claim 1, wherein the parameters further indicate resources to use for transmitting the PRS.

3. The method of claim 1, wherein the parameters further comprise: a periodicity for the PRS, a number of symbols per slot for the PRS, a number of repeated slots for the PRS, a bandwidth (BW) for the PRS, a number of PRS occasions, or any combination thereof.

4. The method of claim 1, wherein the parameters further comprise one or more beam directions or a positioning accuracy.

5. The method of claim 1, wherein the PRS request is transmitted via radio resource control (RRC) signaling.

6. The method of claim 1, wherein the configuration parameters are signaled via a medium access control (MAC) control element (CE), downlink control information (DCI), or both.

7. The method of claim 1, wherein the configuration parameters are signaled via radio resource control (RRC) signaling.

8. The method of claim 1, wherein the PRS request indicates to automatically deactivate the PRS.

9. The method of claim 7, wherein the configuration parameters indicate one or more differences from the parameters requested by the UE.

10. The method of claim 1, wherein the UE is in an idle mode and the PRS request is transmitted via a physical random access channel (PRACH) sequence associated with a set of PRS configuration parameters.

11. The method of claim 10, further comprising: receiving the configuration parameters via a response to the PRACH sequence transmission.

12. The method of claim 11, wherein the response initiates at least one of:
the PRS; or
an exchange of subsequent random access channel (RACH) messages.

13. The method of claim 1, further comprising:
transmitting a request to deactivate the PRS.

14. A method for wireless communication by a network entity, comprising:
receiving a positioning reference signal (PRS) request, from a user equipment (UE), wherein the PRS request indicates parameters comprising a request comb density of a PRS and a quasi-colocation (QCL) to use; and
transmitting the PRS based on configuration parameters selected by the network entity based on the parameters indicated in the PRS request.

15. The method of claim 14, wherein the parameters further indicate resources to use for transmitting the PRS.

16. The method of claim 14, wherein the parameters further comprise: a periodicity for the PRS, a number of symbols per slot for the PRS, a number of repeated slots for the PRS, a bandwidth (BW) for the PRS, a number of PRS occasions, or any combination thereof.

17. The method of claim 14, wherein the parameters further comprise one or more beam directions or a positioning accuracy.

18. The method of claim 14, wherein the PRS request is received via radio resource control (RRC) signaling.

19. The method of claim 14, wherein the configuration parameters are signaled via a medium access control (MAC) control element (CE), downlink control information (DCI), or both.

20. The method of claim 14, wherein the configuration parameters are signaled via radio resource control (RRC) signaling.

21. The method of claim 14, wherein the PRS request indicates to automatically deactivate the PRS.

22. The method of claim 20, wherein the configuration parameters indicate one or more differences from the parameters requested by the UE.

23. The method of claim 14, further comprising:
receiving a deactivation request for deactivating the PRS.

24. An apparatus for wireless communication by a user equipment (UE), comprising:
means for transmitting a positioning reference signal (PRS) request, wherein the PRS request indicates parameters comprising a requested comb density of a PRS and a quasi-colocation (QCL) to use; and
means for performing one or more measurements based on the PRS transmitted in accordance with configuration parameters selected by a network entity based on the parameters indicated in the PRS request.

25. An apparatus for wireless communication by a network entity, comprising:
means for receiving a positioning reference signal (PRS) request, from a user equipment (UE), wherein the PRS request indicates parameters comprising a request comb density of a PRS and a quasi-colocation (QCL) to use; and
means for transmitting the PRS based on configuration parameters selected by the network entity based on the parameters indicated in the PRS request.

26. An apparatus for wireless communication by a user equipment (UE) comprising:
a memory comprising instructions;
one or more transceivers;
one or more processors operably coupled to the one or more transceivers and the memory, the one or more processors configured, individually or in any combination, to execute the instructions and cause the apparatus to:
transmit a positioning reference signal (PRS) request, wherein the PRS request indicates parameters comprises a requested comb density of a PRS and a quasi-colocation (QCL) to use; and
perform one or more measurements based on the PRS transmitted in accordance with configuration parameters selected by a network entity based on the parameters indicated in the PRS request.

27. The apparatus of claim 26, wherein the parameters further indicate resources to use to transmit the PRS.

28. The apparatus of claim 26, wherein the parameters further comprise: a periodicity for the PRS, a number of symbols per slot for the PRS, a number of repeated slots for the PRS, a bandwidth (BW) for the PRS, a number of PRS occasions, or any combination thereof.

29. The apparatus of claim 26, wherein the parameters further comprise one or more beam directions or a positioning accuracy.

30. The apparatus of claim 26, wherein the PRS request is transmitted via radio resource control (RRC) signaling.

31. The apparatus of claim 26, wherein the configuration parameters are signaled via a medium access control (MAC) control element (CE), downlink control information (DCI), or both.

32. The apparatus of claim 26, wherein the configuration parameters are signaled via radio resource control (RRC) signaling.

33. The apparatus of claim 26, wherein the PRS request indicates to automatically deactivate PRS transmission.

34. The apparatus of claim 26, wherein the configuration parameters indicate one or more differences from the parameters requested by the UE.

35. The apparatus of claim 26, where the UE is in an idle mode and the PRS request is transmitted via a physical random access channel (PRACH) sequence associated with a set of PRS configuration parameters.

36. The apparatus of claim 35, wherein the one or more processors are configured, individually or in any combination, to execute the instructions and cause the apparatus to: receive the configuration parameters via a response to the PRACH sequence.

37. The apparatus of claim 26, wherein the one or more processors are configured, individually or in any combination, to execute the instructions and cause the apparatus to transmit a request to deactivate the PRS.

38. An apparatus for wireless communication, comprising:
 a memory comprising instructions;
 one or more transceivers;
 one or more processors operably coupled to the one or more transceivers and the memory, the one or more processors configured, individually or in any combination, to execute the instructions and cause the apparatus to:
  receive a positioning reference signal (PRS) request, wherein the PRS request indicates parameters comprising a requested comb density of a PRS and a quasi-colocation (QCL) to use; and
  transmit the PRS based on configuration parameters selected by the apparatus based on the parameters indicated in the PRS request.

39. The apparatus of claim 38, wherein the parameters indicate resources to use to transmit the PRS.

40. The apparatus of claim 38, wherein the parameters further comprise: a periodicity for the PRS, a number of symbols per slot for the PRS, a number of repeated slots for the PRS, a bandwidth (BW) for the PRS, a number of PRS occasions, or any combination thereof.

41. The apparatus of claim 38, wherein the parameters further comprise one or more beam directions or a positioning accuracy.

42. The apparatus of claim 38, wherein the PRS request is received via radio resource control (RRC) signaling.

43. The apparatus of claim 38, wherein the configuration parameters are signaled via a medium access control (MAC) control element (CE), downlink control information (DCI), or both.

44. The apparatus of claim 38, wherein the configuration parameters are signaled via radio resource control (RRC) signaling.

45. The apparatus of claim 38, wherein the PRS request indicates to automatically deactivate the PRS.

46. The apparatus of claim 44, wherein the configuration parameters indicate one or more differences from the parameters requested by the UE.

47. The apparatus of claim 38, wherein the one or more processors are configured, individually or in any combination, to execute the instructions and cause the apparatus to:
 receive a deactivation request to deactivate the PRS.

* * * * *